United States Patent
Maeda et al.

(10) Patent No.: US 7,844,003 B2
(45) Date of Patent: Nov. 30, 2010

(54) SIGNAL SEPARATING DEVICE AND SIGNAL SEPARATING METHOD

(75) Inventors: Noriyuki Maeda, Yokohama (JP);
Kenichi Higuchi, Yokohama (JP);
Hiroyuki Kawai, Yokosuka (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 473 days.

(21) Appl. No.: 11/577,599

(22) PCT Filed: Sep. 5, 2005

(86) PCT No.: PCT/JP2005/016276
§ 371 (c)(1),
(2), (4) Date: Sep. 20, 2007

(87) PCT Pub. No.: WO2006/043369
PCT Pub. Date: Apr. 27, 2006

(65) Prior Publication Data
US 2008/0095257 A1    Apr. 24, 2008

(30) Foreign Application Priority Data
Oct. 20, 2004 (JP) ............................... 2004-306173

(51) Int. Cl.
*H04K 1/10* (2006.01)
*H04L 27/28* (2006.01)
*H04L 5/12* (2006.01)
*H04L 23/02* (2006.01)
*H04L 1/02* (2006.01)
*H04B 7/02* (2006.01)

(52) U.S. Cl. ........................ 375/260; 375/259; 375/262; 375/267

(58) Field of Classification Search ................. 375/259, 375/260, 267
See application file for complete search history.

(56) References Cited

U.S. PATENT DOCUMENTS
5,936,972 A * 8/1999 Meidan et al. ............... 714/712
(Continued)

FOREIGN PATENT DOCUMENTS
JP    2003-273837    9/2003

OTHER PUBLICATIONS

Hiroyuki Kawai, et al., "Complexity-reduced Maximum Likelihood Detection Based on Replica Candidate Selection with QR Decomposition Using Pilot-Assisted Channel Estimation and Ranking for MIMO Multiplexing Using OFCDM", Technical Report of Institute of Electronics, Information and Communication Engineers, vol. 103 No. 674, Mar. 3, 2004, pp. 55-60, with English abstract.

(Continued)

*Primary Examiner*—David C Payne
*Assistant Examiner*—Erin M File
(74) *Attorney, Agent, or Firm*—Oblon, Spivak, McClelland, Maier & Neustadt, L.L.P.

(57) ABSTRACT

A signal detection apparatus improving signal detection accuracy in a receiver for communications system complying with the MIMO scheme. The signal detection apparatus detects transmission signals sent from transmission antennas based on received signals received by receiving antennas. The apparatus includes: a first determination mechanism for determining symbol candidates of the transmission signals in sequence based on the QRM-MLD method using the received signals arranged in first order; a second determination mechanism for determining symbol candidates of the transmission signals in sequence based on the QRM-MLD method using the received signals arranged in second order that is different from the first order; and an output mechanism for outputting symbol candidates and likelihood of the transmission signals based on determination results of at least the first and the second determination mechanisms.

9 Claims, 8 Drawing Sheets

U.S. PATENT DOCUMENTS

| | | | | |
|---|---|---|---|---|
| 6,801,580 | B2* | 10/2004 | Kadous | 375/267 |
| 6,965,651 | B1* | 11/2005 | Chou | 375/340 |
| 7,154,964 | B1* | 12/2006 | Al-Dhahir et al. | 375/299 |
| 7,194,041 | B2* | 3/2007 | Kadous | 375/267 |
| 2001/0050964 | A1* | 12/2001 | Foschini et al. | 375/267 |
| 2003/0189999 | A1* | 10/2003 | Kadous | 375/349 |
| 2004/0013205 | A1* | 1/2004 | Brunel | 375/264 |
| 2004/0028157 | A1 | 2/2004 | Aoki et al. | |
| 2004/0218570 | A1* | 11/2004 | Black et al. | 370/335 |
| 2005/0008092 | A1* | 1/2005 | Kadous | 375/267 |
| 2005/0084028 | A1* | 4/2005 | Yu et al. | 375/267 |
| 2005/0195914 | A1* | 9/2005 | Kim et al. | 375/267 |
| 2006/0045200 | A1* | 3/2006 | Bocquet | 375/267 |
| 2006/0146965 | A1* | 7/2006 | Kwun et al. | 375/341 |
| 2006/0182195 | A1* | 8/2006 | Miller | 375/267 |

OTHER PUBLICATIONS

Jinho Choi, "A Bi-Directional Zero-Forcing BLAST Receiver", IEEE Transactions on Signal Processing, vol. 52 No. 9, Sep. 2004, pp. 2670-2673.

Noriyuki Maeda, et al., "MLD With QR Decomposition Using Bi-Directional Ranking and Selection of Surviving Symbol Replicas for OFCDM MIMO Multiplexing", Wireless Personal Multimedia Communications 2004, vol. 1, 2004, 7 Pages.

Noriyuki Maeda, et al., "QRM-MLD o Mochiiru OFCDM MIMO Taju ni Okeru Sohoko Soshin Shingo Ranking-Ho", NEN IEICE Communications Society Taikai Doen Ronbumshu, Sep. 8, 2004, p. 342, English Translation.

Kyeong Jin Kim, et al., "Joint Channel Estimation and Data Detection Algorithms for MIMO-OFDM Systems", Conference on Signals, Systems, and Computers, Nov. 2002, pp. 1857-1861.

Hiroyuki Kawai, et al., " Independent Adaptive Control of Surviving Symbol Replica Candidates at Each Stage Based on Minimum Branch Metric in QRM-MLD for OFCDM MIMO Multiplexing", Vehicular Technology Conference, vol. 3, Sep. 29, 2004, pp. 1558-1564.

Kenichi Higuchi, et al., "Likelihood Function for QRM-MLD Suitable for Soft-Decision Turbo Decoding and its Performance for OFCDM MIMO Multiplexing in Multipath Fading Channel", Personal Indoor and Mobile Radio Communications, vol. 2, pp. 1142-1148, Sep. 12, 2004.

* cited by examiner

SIGNAL SEPARATING DEVICE AND SIGNAL SEPARATING METHOD

BACKGROUND

1. Technical Field

The present invention generally relates to a technical field of wireless communications of a Multiple-Input Multiple-Output (MIMO) scheme. More particularly, the present invention relates to a signal detection apparatus and a signal detection method used in a receiver for the MIMO scheme.

2. Background Art

In this kind of technical fields research and development are being promoted for realizing large-capacity high-speed information communications coming after current and next-generation techniques. For example, in addition to a Single-Input Single-Output (SISO) scheme, researches are being promoted for a Single-Input Multiple-Output (SIMO) scheme, a Multiple-Input Single-Output (MISO) and the Multiple-Input Multiple-Output (MIMO) scheme and the like from the viewpoint of increasing communications capacity.

Figure 1:
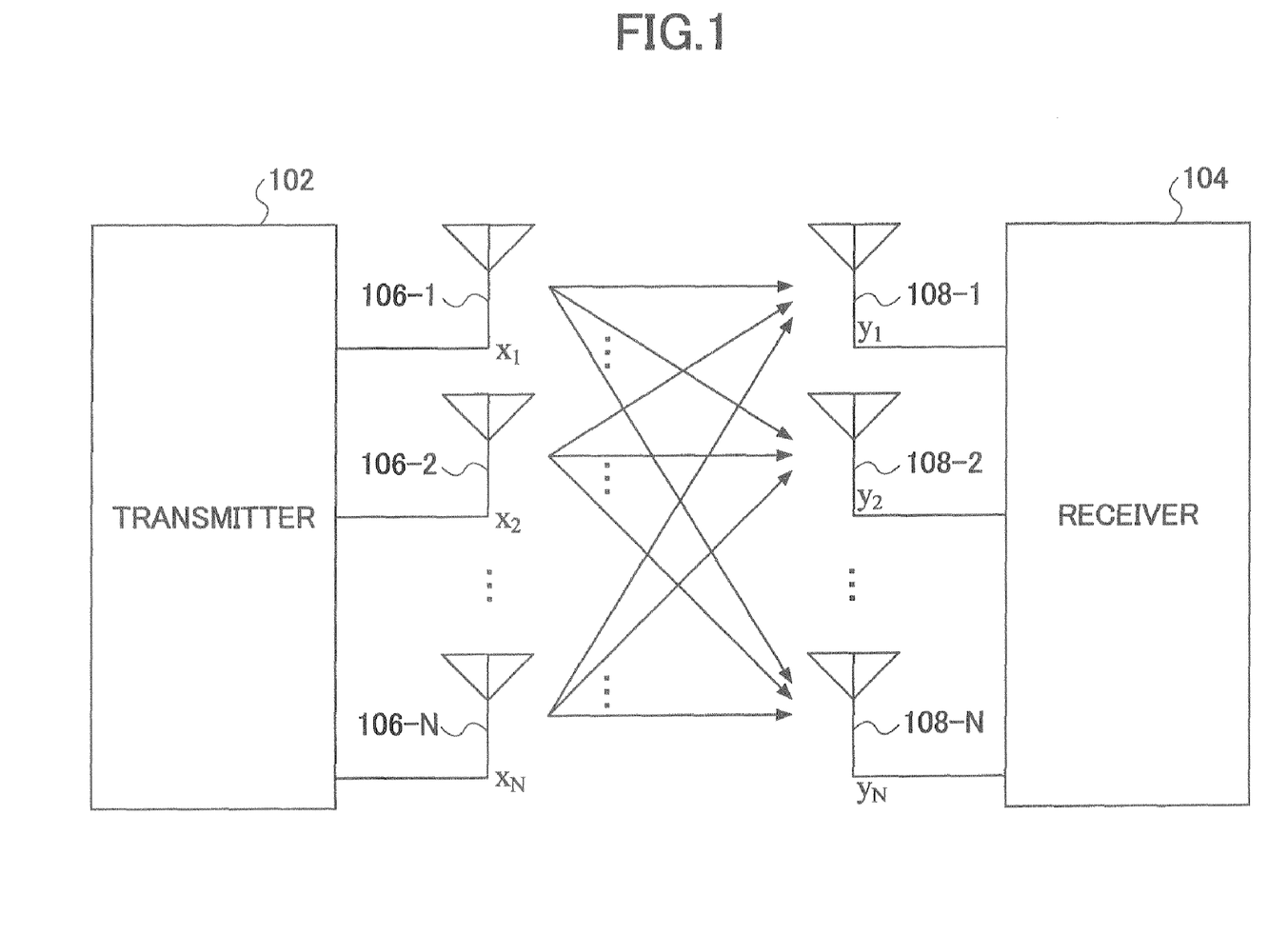
FIG. 1 is a figure showing an outline of a communications system of the MIMO scheme.

FIG. 1 shows an outline of a communications system of the MIMO scheme including a transmitter 102 and a receiver 104. In the MIMO scheme, different signals are transmitted from transmission antennas 106-1~N simultaneously with a same frequency. These transmission signals are received by receiving antennas 108-1~N. Although, both of the number of the transmission antennas and the number of the receiving antennas are N for the sake of simplicity, they may be different. In the receiver 104, a process is performed for detecting each signal of a plurality of signals from the transmitter based on the received signals received by each receiving antenna. The detected signals are supplied to subsequent process components for performing further demodulation process.

There are several methods for signal detection performed in the receiver 104. One is a method called Maximum Likelihood Detection (MLD) method. In this method, a Euclidean distance or the square is calculated for every possible combination of the transmission signals transmitted from the transmission antennas and the received signal so as to select a combination of transmission signals that provides a minimum distance. According to this method, each signal of the transmission signals can be detected with reliability. But, there is a problem in that calculation load required for signal detection becomes large since it is necessary to calculate the squared Euclidean distance many times. For example, assuming that four transmission signals are transmitted from four transmission antennas using a 16QAM modulation scheme. In this case, since a transmission signal is mapped into any one of 16 constellation points, a total sum of combinations of transmission signals included in the received signal becomes (number of constellation points for one transmission signal)$^{(\text{number of transmission antennas})} = 16^4 = 65536$. It requires very large calculation capacity to calculate the squared Euclidian distance for every combination so as to select a maximum likelihood combination, and, especially, downsizing of mobile terminals is inhibited. Further, when the calculation load is large, power consumption becomes large, which is especially disadvantageous for a small mobile terminal.

The QRM-MLD method is a signal detection method modified from the MLD method. In this method, QR decomposition and M algorithm are combined with the MLD method so as to try to decrease the number of times of calculations of the squared Euclidean distance. According to this method, in the above-mentioned assumed example, the number of times of the calculation can be decreased to (number of candidates of constellation points in a first stage)+(number of newly added candidates of constellation points)×(number of surviving candidates of constellation points in previous stage)×(number of transmission antennas)=16+16×16×3=784. The QRM-MLD method is described in the non-patent document 1, for example.

Figure 2:
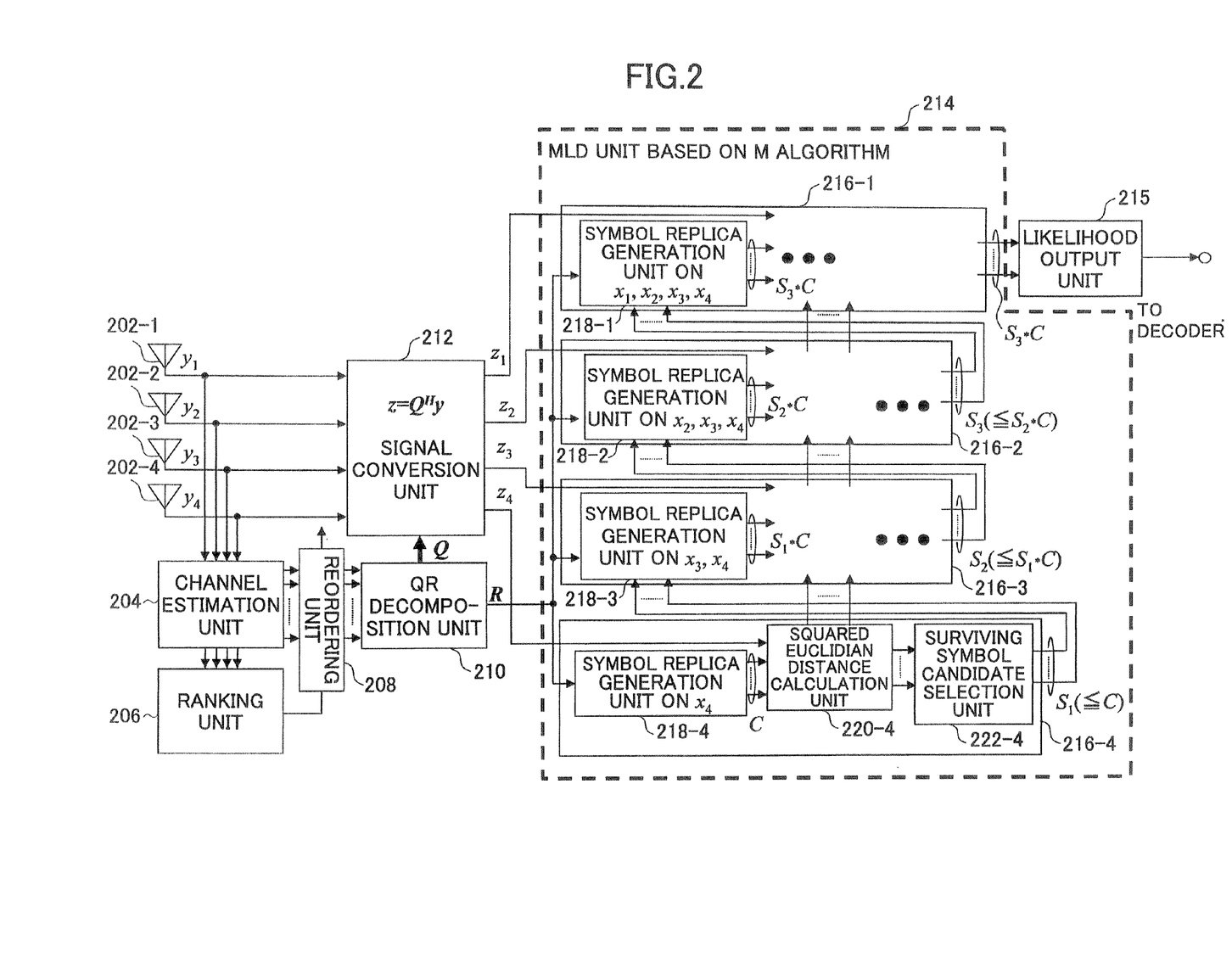
FIG. 2 is a partial block diagram of a receiver that performs conventional signal detection.

FIG. 2 shows a partial block diagram of a receiver that performs signal detection according to a conventional QRM-MLD method. For the sake of simplicity, four transmission signals $x = (x_1 \ldots x_4)^T$ are transmitted from four transmission antennas respectively with the 16 QAM modulation scheme (the superscript T represents transpose). The receiver includes a plurality of receiving antennas 202-1, 202-2, 202-3 and 202-4, a channel estimation unit 204, a ranking unit 206, a reordering unit 208, a QR decomposition unit 210 a signal conversion unit 212, a maximum likelihood determination unit 214, and a likelihood output unit 215. The maximum likelihood determination unit 214 includes four determination units 216-1, 216-2, 216-3 and 216-4. The number of determination units is determined according to the number of transmission signals. Since each determination unit includes same process blocks, a fourth determination unit 216-4 is described as a representative. The determination unit includes a symbol replica generation unit 218-4, a squared Euclidian distance calculation unit 220-4 and a surviving symbol candidate selection unit 222-4.

The channel estimation unit 204 obtains a channel impulse response (CIR) or a channel estimation value based on a received signal including a pilot signal known in both sides of transmission and receiving. A matrix H having each channel estimation value hag as each matrix element is called a channel matrix, wherein $h_{nm}$ represents a channel estimation value between a m-th transmission antenna and a n-th receiving antenna, and, $1 \leq n, m \leq 4$ holds true in the present example.

The ranking unit 206 rates or ranks a plurality of received signals $y_1, \ldots, y_4$ in order of the size of power.

The reordering unit 208 reports arranging order of the received signals to the QR decomposition unit 210 and to the signal conversion unit 212.

The QR decomposition unit 210 obtains matrixes Q and R such that the channel matrix H obtained by the channel estimation unit 204 is represented as a product of a unitary matrix Q and an upper triangular matrix R (H=QR).

The signal conversion unit 212 multiplies a vector $y = (y_1 \ldots y_4)^T$ having the received signals as its elements by a conjugate transpose matrix $Q^H$ of the unitary matrix Q to perform signal conversion. The superscript H indicates conjugate transpose The relationship of y=Hx=QRx holds true between a transmission signal x and a received signal y. By multiplying this equation by $Q^H$ from the left, the left side becomes $Q^H y = z$ and the right side becomes $Q^H QRx = Q^{-1} QRx = Rx$. Therefore, relationship between the transmission and received signals can be represented as z=Rx as follows, wherein $z = (z_1 \ldots z_4)^T = Q^H y$.

$$
\begin{array}{ccc}
Q^H y & \text{UPPER TRIANGULAR} & \text{TRANSMISSION} \\
 & \text{MATRIX R} & \text{SIGNAL x}
\end{array}
$$

$$
\begin{bmatrix} z_1 \\ z_2 \\ z_3 \\ z_4 \end{bmatrix} = \begin{bmatrix} r_{11} & r_{12} & r_{13} & r_{14} \\ 0 & r_{22} & r_{23} & r_{24} \\ 0 & 0 & r_{33} & r_{33} \\ 0 & 0 & 0 & r_{44} \end{bmatrix} \begin{bmatrix} x_1 \\ x_2 \\ x_3 \\ x_4 \end{bmatrix}
$$

The relational express on can be also written as follows.

$$z_1 = r_{11}x_1 + r_{12}x_2 + r_{13}x_3 + r_{14}x_4$$

$$z_2 = r_{22}x_2 + r_{23}x_3 + r_{24}x_4$$

$$z_3 = r_{33}x_3 + r_{34}x_4$$

$$z_4 = r_{44}x_4$$

The maximum likelihood determination unit 214 narrows down symbol candidates of transmission signals using the maximum likelihood determination method (MLD method). The symbol replica generation unit 218-4 in the determination unit 216-4 generates symbol candidates of transmission signals corresponding to a received signal $x_4$ using matrix elements of the upper triangular matrix R. The number of symbol candidates is c, for example.

The squared Euclidean distance calculation unit 220-4 calculates a squared Euclidean distance between the converted received signal $z_i$ and c symbol candidates. The squared Euclidian distance represents a metric on which calculation of likelihood is based. A symbol candidate for which small squared Euclidian distance is obtained is determined to be one near a transmitted symbol.

The surviving symbol candidate selection unit 222-4 outputs $S_1(\leq C)$ symbol candidates as surviving symbol candidates based on the squared Euclidian distance for each candidate.

The likelihood output unit 215 calculates likelihood or reliability of the symbol candidates output from the surviving symbol candidate unit of the final stage. More particularly, the likelihood is represented as LLR (Log Likelihood Ratio). The output from the likelihood output unit 215 represents a signal detection result and is transmitted to a modulation unit (turbo decoder, for example) of a subsequent stage.

Operation is described next. The receiver receives transmission signals as received signals $y_1 \sim y_4$ with four antennas. These signals are supplied to the channel estimation unit 204 and the signal conversion unit 212. The order of the received signals are determined by the channel estimation unit 204, the ranking unit 206 and the reordering unit 208. In this example, the received signals are ordered in order of the size of received powers and it is assumed that received power becomes larger in order of $x_1$, $x_2$, $x_3$ and $x_4$. The received signals are converted such that $z = (z_1 \ldots z_4)^T = Q^H y$ holds true by the signal conversion unit 212, and the converted signals are supplied to the maximum likelihood determination unit 214.

In a first stage in the maximum likelihood determination unit 214, a process corresponding to initial setting is performed in the determination unit 216-4. In this stage, the above equation on $z_4$ is focused on. Since a matrix element $r_{44}$ is known, it turns out that $z_4$ depends only on one transmission signal $x_4$. Therefore, the transmission signal $x_4$ has 16 constellation point candidates at most. The symbol candidate generation unit 218-4 generates 16 (C=16) symbol candidates on $x_4$. The squared Euclidian distance calculation unit 220-4 calculates squared Euclidian distances between each symbol candidate and the fourth received signal $z_4$. Then, $S_1$ symbol candidates are selected in ascending order of the distance as surviving symbol candidates.

A second stage is performed by the determination unit 216-3. In this stage, the equation on $z_3$ is focused on. Matrix elements $r_{33}$ and $r_{34}$ are known, there are 16 candidates for $x_4$, and also there are 16 constellation candidates for $x_3$. As new constellation points on $x_3$, 16 constellation points are introduced by the symbol generation unit 218-3. Therefore, there may be 16×16=256 combinations of constellation points.

Thus, 256 squared Euclidian distances between each of these symbol candidates and the third received signal $x_3$ are calculated, so that symbol candidates are narrowed down by selecting 16 ($S_2$=16) candidates in ascending order of the value.

In a third stage, similar process is performed in the determination unit 216-2. In this stage, the equation on $z_2$ is focused on. Matrix elements $r_{22}$, $r_{23}$ and $r_{24}$ are known, combinations of transmission signals $x_3$ and $x_4$ are narrowed down to 16 candidates in the previous stage, and there are 16 constellation point candidates for $x_2$. Therefore, the symbol candidate generation unit 218-2 generates 16 symbol candidates on $x_2$. Also in this case, 16 ($S_3$=16, candidates having small squared Euclidian distance are selected from among 256 constellation point combinations so as to narrow down symbol candidates.

In a fourth stage, similar process is performed in the determination unit 216-1. In this stage, the equation on $z_1$ is focused on. Matrix elements $r_{11}$, $r_{12}$, $r_{13}$ and $r_{14}$ are known, combinations of transmission signals $x_2$, $x_3$ and $x_4$ are narrowed down to 16 candidates in the previous stage, and there are 16 constellation point candidates for $x_1$. Therefore, the symbol candidate generation unit 218-1 generates 16 symbol candidates on $x_1$. In the fourth stage, 256 combinations of constellation points are output to the likelihood output unit 215.

Accordingly, by limiting the number of symbol candidates to equal to or less than a constant number ($S_1 \leq C$ and the like) in each stage, symbol candidates of transmission signals can be narrowed down without calculating squared Euclidian distances for all possible combinations of constellation points.

[Non-patent document 1] K. J. Kim, et al., "Joint channel estimation and data detection algorithms for MIMO-OFDM systems", Proc. 36th Asilomar Conference on Signals, Systems and Computers, November 2002

PROBLEM TO BE SOLVED BY THE INVENTION

By the way, according to the above-mentioned method, the number of symbol candidates gradually decreases as the stage proceeds from the first stage to the fourth stage. For example, the number of candidates for the fourth transmission signal $x_4$ introduced in the first stage decreases (is narrowed down) as the stage proceeds to the second state, the third stage and the fourth stage. Similarly, the number of candidates for the third transmission signal $x_3$ introduced in the second stage decreases as the stage proceeds to the third stage and the fourth stage. The number of candidates for the second transmission signal $x_2$ introduced in the third stage decreases as the stage proceeds to the fourth stage. Then, candidates for the first transmission signal $x_1$ introduced in the fourth stage are reflected as output from the maximum likelihood determination unit as it is.

Figure 3:
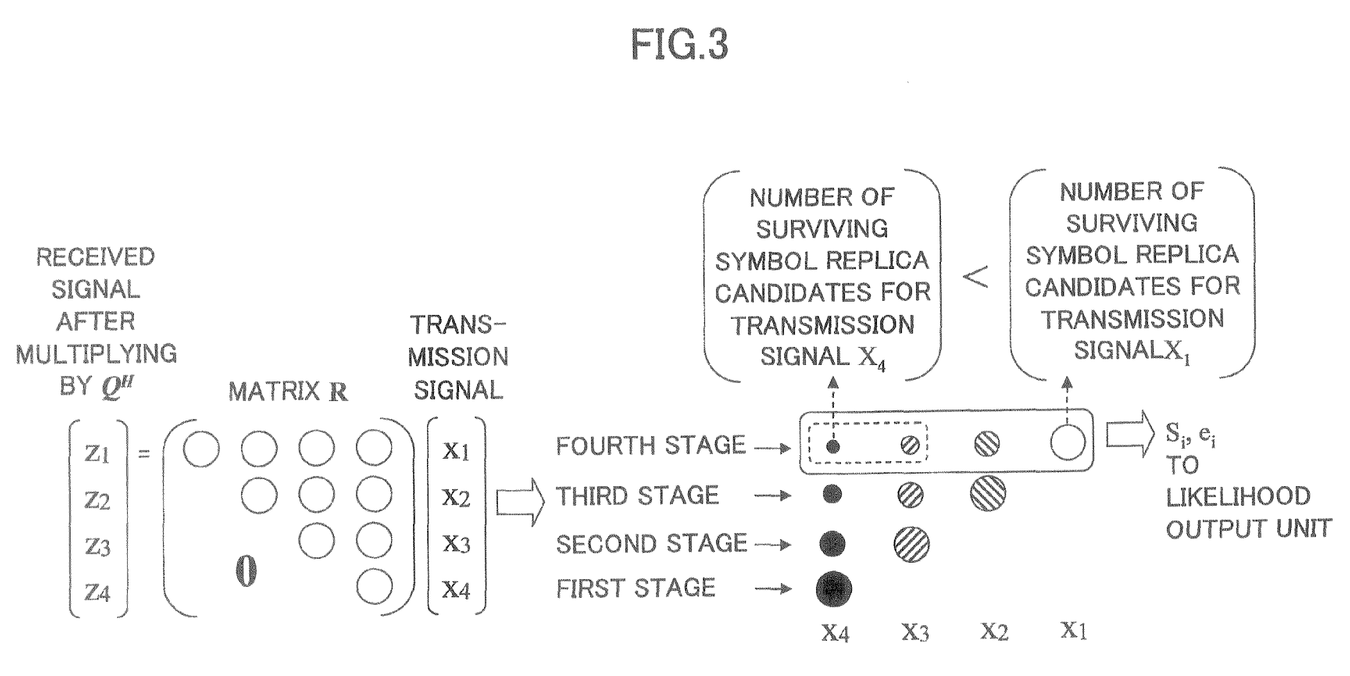
FIG. 3 is a schematic diagram showing a manner for narrowing down symbol candidates.

FIG. 3 shows a manner in which the number of symbol candidates gradually decreases as the stage proceeds. The size of each circle drawn above the transmission signals $x_1$, $x_2$, $x_3$ and $x_4$ corresponds to the number of candidates in each stage. It turns out that the number of symbol candidates on the fourth transmission signal $x_4$ is smallest in the fourth stage, and that the number of symbol candidates becomes smaller in order of first, second and third transmission signals $x_1$, $x_2$ and $x_3$. Therefore, it is concerned that candidates for the fourth transmission signal $x_4$ may be excessively narrowed down so that an actual symbol candidate of the fourth transmission signal $x_4$ may be missed in the fourth stage. As to candidates for the third transmission signal $x_3$, though not to the extent of the transmission signal $x_4$/it is concerned that candidates may be excessively narrowed down so that an actual symbol candidate for the third transmission signal $x_3$ may be missed in the fourth stage in the example shown in the figure, each symbol candidate number for transmission signals $x_4$ and $x_3$ enclosed by a dotted line frame becomes very small. If an actual symbol candidate is missed, estimation accuracy for the transmission signal, that is, transmission characteristics degrade. Such excessive narrowing down may be avoided to some extent by dealing with a signal having high power value as a transmission signal determined in the first stage. But, that is not enough. Excessive narrowing down for symbol candidates may be avoided by increasing the number of surviving symbol candidates in each stage. However, in exchange for that, calculation load for calculating the squared Euclidian distances largely increases.

Figure 4:
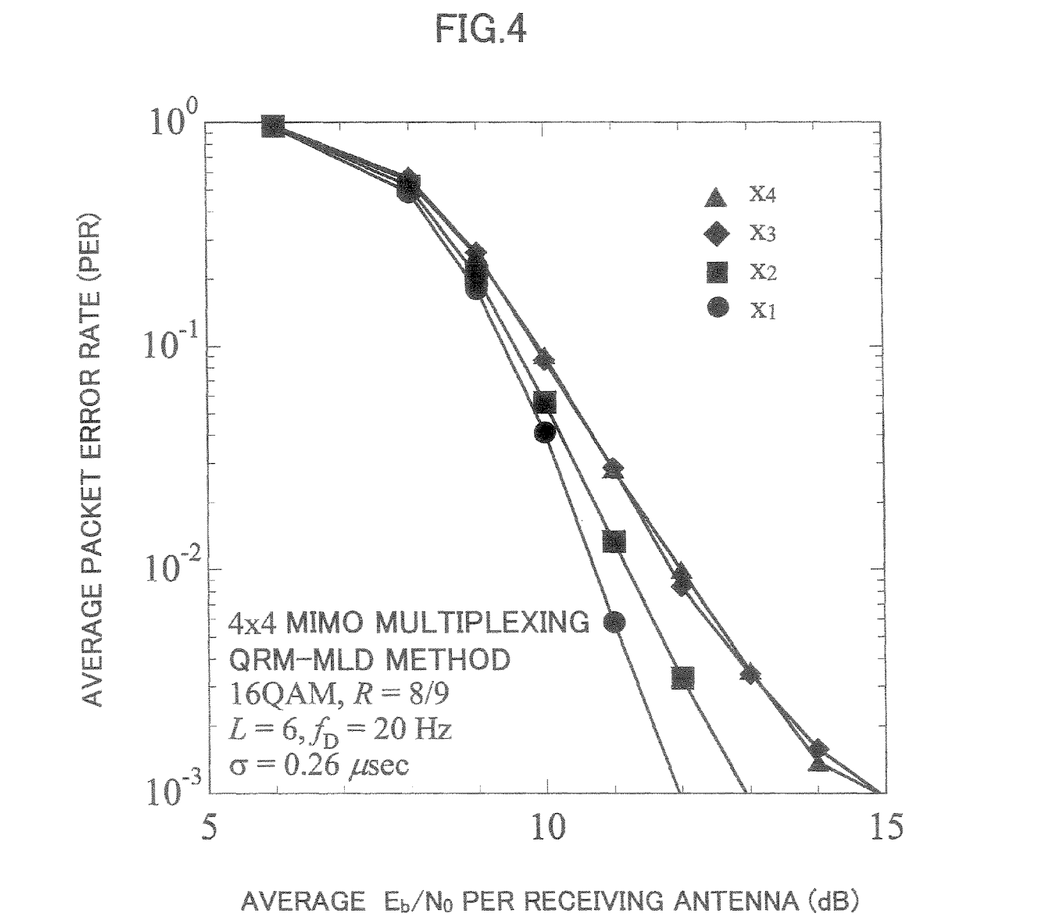
FIG. 4 is a figure showing a simulation result according to a conventional signal detection method.

FIG. 4 shows a simulation result in which signal detection for the first to fourth transmission signals $x_1$, $x_2$, $x_3$ and $x_4$ is performed on the basis of the above-mentioned assumed example. Following are main conditions used for the simulation:

Number of transmission and receiving antennas: 4;
Modulation scheme: 16QAM;
Turbo coding ratio: 8/9;
Estimated number of multi-paths L: 6;
Delay spread σ: 0.26 μsec In the figure, the lateral axis indicates an average of signal power to noise power density ratio per 1 bit of information ($Eb/N_0$). The vertical axis indicates average packet error rate (PER). Signs of ▲, ◆, ■ and ● indicate estimation results for transmission signals $x_4$, $x_3$, $x_2$ and $x_1$ respectively. As shown in the figure, it turns out that estimation accuracy for transmission signal $x_4$ (▲) where the number of symbol candidates is smallest is worst, and that estimation accuracy for transmission signal $x_1$(●) where the number of symbol candidates is kept to be largest is the best. As to the transmission signals $x_2$ and $x_3$, similar tendency can be found. Accordingly, as to signal detection method by the conventional QRM-MLD method, it is concerned that estimation accuracy for a part of transmission signals (the whole of the transmission signals by extension) degrade. In addition, according to the conventional signal detection method, it is also inconvenient that quality of signal estimation accuracy varies among a plurality of transmission signals.

The present invention is contrived for solving at least one of the above-mentioned problems, and an object is to provide a signal detection apparatus and a signal detection method for improving signal detection accuracy in a receiver for a communications system complying with the MIMO scheme.

SUMMARY

In the present invention, a signal detection apparatus for detecting transmission signals from transmission antennas based on received signals received by receiving antennas is used. The apparatus includes:

first determination means for determining symbol candidates of the transmission signals based on the QRM-MLD method using the received signals arranged in first order;

second determination means for determining symbol candidates of the transmission signals based on the QRM-MLD method using the received signals arranged in second order that is different from the first order; and output means for outputting symbol candidates and likelihood of the transmission signals based on determination results of at least the first and the second determination means.

EFFECT OF THE INVENTION

According to the present invention, signal detection accuracy can be improved in a receiver for the communications system complying with the MIMO scheme.

DETAILED DESCRIPTION

Description of Reference Signs 102 transmitter; 104 receiver; 106-1~N transmission antenna; 108-1~N receiving antenna; 202-1~4 receiving antenna; 204 channel estimation unit; 206 ranking unit; 208 reordering unit; 210 QR decomposition unit; 212 signal conversion unit; 214 maximum likelihood determination unit; 215 likelihood output unit; 216-1~4 determination unit; 218-1~4 symbol replica generation unit; 220-1~4 squared Euclidian distance calculation unit; 222-1~4 surviving symbol candidate selection unit;

502-1~4 receiving antenna; 504 channel estimation unit; 506 ranking unit; 508-1,2 reordering unit; 510-1,2 QR decomposition unit; 512-1,2 signal conversion unit; 514-1,2 maximum likelihood determination unit; 516 symbol candidate selection unit; 518 likelihood output unit; 520 signal line According to an embodiment of the present invention, the received signals are arranged in first order, symbol candidates of the transmission signals are determined based on the QRM-MLD method according to the first order, the received signals are arranged in second order that is different from the first order, symbol candidates of the transmission signals are determined based on the QRM-MLD method according to the second order, and symbol candidates and likelihood of the transmission signals are output based on determination results obtained with respect to the first and the second orders. Accordingly, there occurs a possibility that a symbol candidate missed in one maximum likelihood determination is not missed in another maximum likelihood determination, so that signal estimation accuracy can be improved by considering both of determination results. Therefore, estimation accuracy can be improved without increasing calculation load excessively. In addition, variations of estimation accuracy among transmission symbols can be decreased to be small.

According to an embodiment of the present invention, the second order is the reverse of the first order. Accordingly, a symbol candidate missed in one maximum likelihood determination can be kept in another maximum likelihood determination with high possibility.

According to an embodiment of the present invention, the second determination means determines symbol candidates of a part of the transmission signals according to the detection result of the first determination means, and determines symbol candidates of remaining transmission signals using the QRM-MLD method. Accordingly, calculation load in the second determination unit can be decreased.

According to an embodiment of the present invention, the output means updates likelihood of a symbol candidate commonly included in detection results of the first and the second determination means. For example, the updated likelihood is a weighted average of likelihoods of symbol candidates obtained by the first and the second determination means. Also for example, the updated likelihood is less than any of likelihoods of symbol candidates obtained by the first and the second determination means. Also for example, the updated likelihood is equal to one of likelihoods of symbol candidates obtained by the first and the second determination means. Accordingly, likelihood of the symbol candidate commonly included in both of the determination results can be evaluated more properly.

In the following, embodiments of the present invention are described.

First Embodiment

Figure 5:
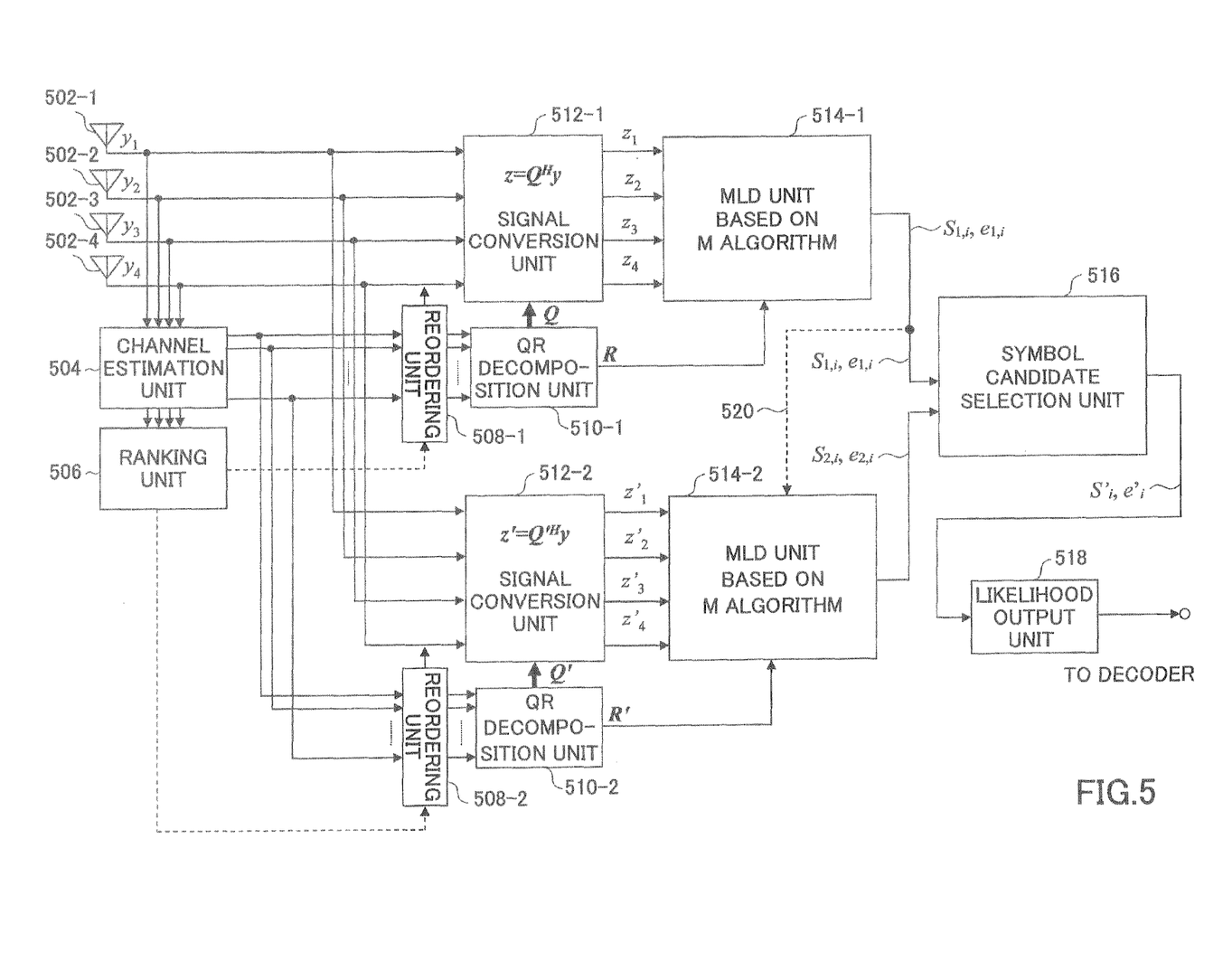
FIG. 5 is a partial block diagram of a receiver for performing signal detection according to an embodiment of the present invention.

FIG. 5 shows a partial block diagram of a receiver for performing the signal detection method according to an embodiment of the present invention. For the sake of simplicity, it is assumed that four transmission signals $x=(x_1 \ x_4)^T$ are transmitted from the four transmission antennas respectively with the 16QAM modulation scheme. But, the number of antennas and the modulation scheme and the like are not limited to these. The receiver includes a plurality of receiving antennas 502-1, 502-2, 502-3 and 502-4, a channel estimation unit 504, a ranking unit 506, reordering units 508-1 and 2, QR decomposition units 510-1 and 2, signal conversion units 512-1 and 2, maximum likelihood determination units 514-1 and 2, symbol candidate selection unit 516 and a likelihood output unit 518. Since each of the maximum likelihood determination units 514-1 and 2 includes configuration and functions similar to those of the maximum likelihood determination unit 214 shown in FIG. 2, detailed description is not provide.

The channel estimation unit 504 obtains channel impulse response (CIR) or channel estimation value based on received signals including a known pilot signal in both sides of transmission and receiving. A matrix H including each channel estimation value hag as each matrix element is called a channel matrix, wherein $h_{nm}$ represents a channel estimation value between a m-th transmission antenna and a n-th receiving antenna, and $1 \leq n$, $m \leq 4$ is satisfied in this example. But, various values may be taken as the number of antennas.

The ranking unit 506 ranks the received transmission signals $x_1, \ldots, x_4$ in order of signal quality. The signal quality is evaluated according to size of received signal power, ratio of desired wave power or non-desired wave power to total received power and the like.

The reordering unit 508-1 arranges the received signals in first order according to the ranks assigned to each received signal by the ranking unit 506, and reports the order to the QR decomposition unit 510-1 and to the signal conversion unit 512-1. In this embodiment, the first order is an order in which received signal power of each received signal increases gradually. For the sake of simplicity, it is assumed that the first order is $y_1$, $y_2$, $y_3$ and $y_4$.

The reordering unit 508-2 arranges the received signals in second order according to the ranks assigned to each received signal by the ranking unit 506 and reports the order to the QR decomposing unit 510-2 and to the signal conversion unit 512-2. In this embodiment, the second order is an order in which received signal power of each received signal decreases gradually, namely it is reversal of the first order. Received signals are arranged in the second order as $y_4$, $y_3$, $y_2$ and $y_1$.

The QR decomposition unit 510-1 obtains matrixes Q and R such that the channel matrix H obtained by the channel estimation unit 504 is represented as a product of a unitary matrix Q and an upper triangular matrix R (H=QR). Information on the matrix Q is provided to the signal conversion unit 512-1, and information on the matrix R is provided to the maximum likelihood determination unit 514-1.

The QR decomposition unit 510-2 obtains matrixes Q' and R' such that the channel matrix H' obtained by the channel estimation unit 504 is represented as a product of a unitary matrix Q' and an upper triangular matrix R' (H'=Q'R'). Information on the matrix Q' is provided to the signal conversion unit 512-2, and information on the matrix R' is provided to the maximum likelihood determination unit 514-2. The received signals are supplied to the QR decomposition units 510-1 and 2 in different orders by the reordering units 508-1 and 2 respectively. The channel matrix varies depending on the order of the received signals. Thus, it is general that unitary matrixes and upper triangular matrixes calculated by the QR decomposition units 510-1 and 2 are different.

The signal conversion unit 512-1 performs signal conversion ($z=Q^H y$) by multiplying a vector $y=(y_1 \ y_2 \ y_3 \ y_4)^T$ including the received signals as components by a conjugate transpose matrix $Q^H$ of the unitary matrix Q. Between the received signal z after signal conversion and transmission signal x, z=Rx holds true.

$$\begin{bmatrix} z_1 \\ z_2 \\ z_3 \\ z_4 \end{bmatrix} = \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \begin{bmatrix} x_1 \\ x_2 \\ x_3 \\ x_4 \end{bmatrix}$$

The above relational expression can be written as:

$z_1 = r_{11}x_1 + r_{12}x_2 + r_{13}x_3 + r_{14}x_4$ $z_2 = r_{22}x_2 + r_{23}x_3 + r_{24}x_4$ $z_3 = r_{33}x_3 + r_{34}x_4$ $z_4 = r_{44}x_4$.

The signal conversion unit 512-2 performs signal conversion ($z'=Q'^H y'$) by multiplying a vector $y'=(y_1 \ y_2 \ y_3 \ y_4)^T$ including the received signals as components by a conjugate transpose matrix $Q^H$ of the unitary matrix Q. Between the received signal z after signal conversion and transmission signal x, z=Rx holds true.

$$\begin{bmatrix} z'_1 \\ z'_2 \\ z'_3 \\ z'_4 \end{bmatrix} = \begin{bmatrix} r'_{11} & r'_{12} & r'_{13} & r'_{14} \\ 0 & r'_{22} & r'_{23} & r'_{24} \\ 0 & 0 & r'_{33} & r'_{34} \\ 0 & 0 & 0 & r'_{44} \end{bmatrix} \begin{bmatrix} x_4 \\ x_3 \\ x_2 \\ x_1 \end{bmatrix}$$

The above relational expression can be written as:

$$z_1' = r_{11}'x_4 + r_{12}'x_3 + r_{13}'x_2 + r_{14}'x_1$$

$$z_2' = r_{22}'x_3 + r_{23}'x_2 + r_{24}'x_1$$

$$z_3' = r_{33}'x_2 + r_{34}'x_1$$

$$z_4' = r_{44}'x_1.$$

The maximum likelihood determination unit 514-1 narrows down symbol candidate of transmission signals using the maximum likelihood determination method (MLD method). In the same way as the maximum likelihood determination unit 214 shown in FIG. 2, the maximum likelihood determination unit 514-1 determines symbol candidates in order of transmission signals $x_4$, $x_3$, $x_2$ and $x_1$ so as to output a determination result. The determination result is represented by determined symbol candidates $S_{1,i}$ and metrics $e_{1,i}$ for the candidates. The subscript "1" indicates that it relates to the first order. The subscript "i" is an index indicating which is selected from among many symbol candidates. The metric can be represented by a squared Euclidian distances for example.

Also, the maximum likelihood determination unit 514-2 narrows down symbol candidates of transmission signals using the maximum likelihood determination method (MLD method). Different from the maximum likelihood determination unit 514-1, the maximum likelihood determination unit 514-2 determines symbol candidates in order of transmission signals $x_1$, $x_2$, $x_3$ and $x_4$ so as to output a determination result. The determination result is represented by determined symbol candidates $S_{2,j}$ and metrics $e_{2,j}$ for the candidates The subscript "2" indicates that it relates to the second order. The subscript "j" is an index indicating which is selected from among many symbol candidates.

The symbol candidate selection unit 516 outputs one or more symbol candidate $S'_m$ with a metric $e'_m$ as a maximum likelihood determination result based on outputs from the maximum likelihood determination units 514-1 and 2. There are various methods for deriving the final determination result from the determination results based on the first and second orders. For example, it is assumed that first and second determination results commonly include m-th symbol candidate and it is output as symbol candidates $S_{1,m}$ and $S_{2,m}$ and metrics $e_{1,m}$ and $e_{2,m}$ from the maximum likelihood determination units 514-1 and 2 respectively. In this case, the symbol candidate selection unit 516 determines the m-th symbol candidate to be the symbol candidate $S'_m$ output from it. The metric $e'_m$ output from the symbol candidate selection unit 516 may be an average value $(e_{1,m}+e_{2,m})/2$ of the metrics, may be a value $(e_{1,m}+e_{2,m})/(2X)$ (X>1) obtained by contracting the average values may be a weighted average value $(c_1 \times e_{1,m} + c_2 \times e_{2,m})$ ($c_1$, $c_2$ are weighting coefficients) or may be a smaller value min$\{e_{1,m}, e_{2,m}\}$, a value min$\{e_{1,m},e_{2,m}\}/X$ (X>1) contracted from the small value, or may be a small fixed value or the like. Or, a metric of a symbol candidate which is not commonly included in the first and second determination results in symbol candidates output from the symbol candidate selection unit 516 may be increased to be larger than that of the symbol candidate commonly included.

The likelihood output unit 518 calculates likelihood of the symbol candidate output from the symbol candidate selection unit 516. More particularly the likelihood is represented as log likelihood ratio (LLR). The output from the likelihood output unit 518 indicates a signal detection result, and is transmitted to a later-stage modulation unit such as a turbo decoder, for example.

Figure 6:
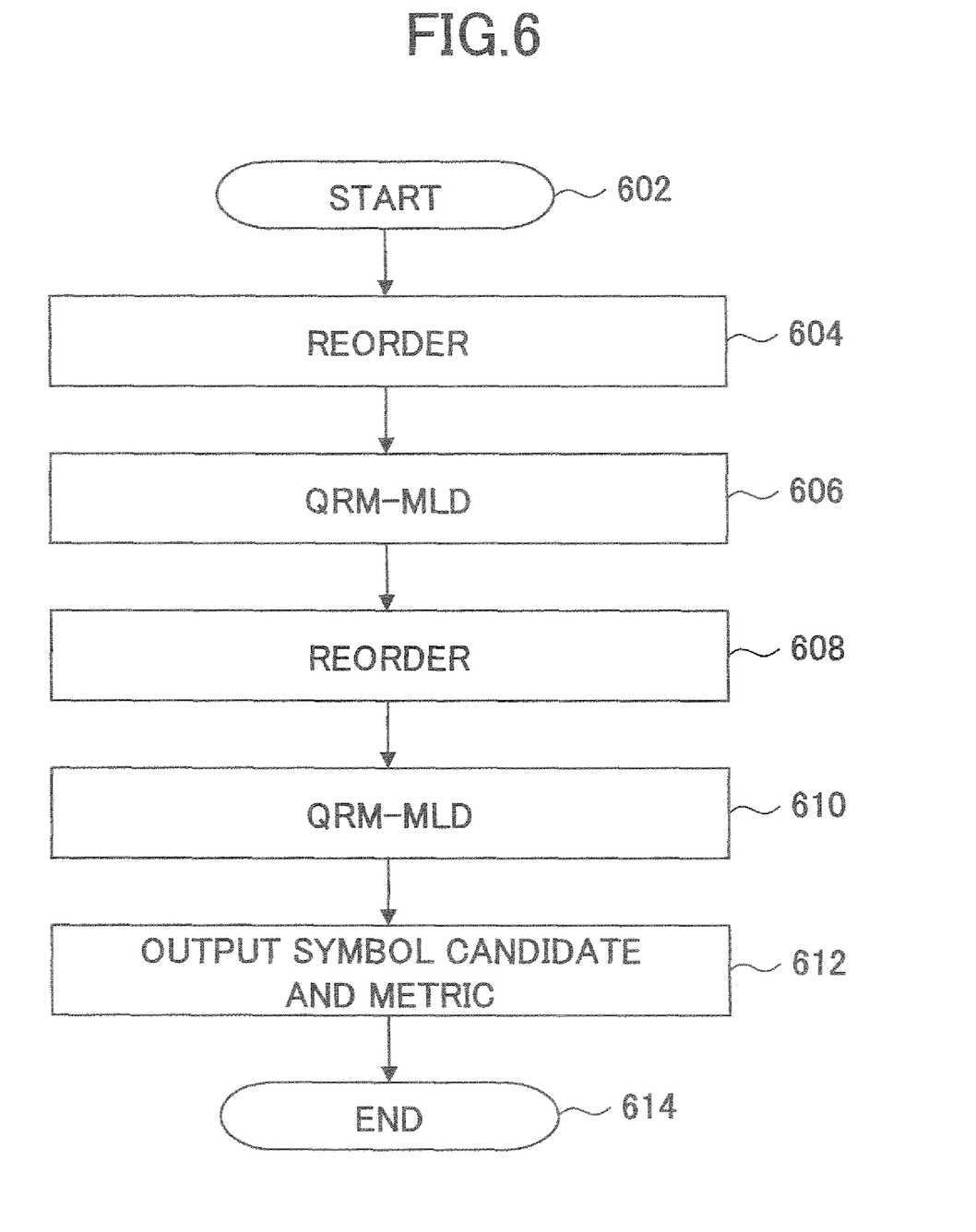
FIG. 6 is a flowchart indicating a signal detection method according to an embodiment of the present invention.

FIG. 6 is a flowchart indicating a signal detection method according to an embodiment of the present invention. The flow starts from step 602 and goes to step 604. In step 604, the received signals are reordered in the first order. The first order is an order of size of received signal power. The reordering is performed in the ranking unit 506 and the reordering unit 508-1 shown in FIG. 5.

In step 606, symbol candidates of the transmission signals are obtained based the QRM-MLD method using the received signals ordered in the first order.

In step 608, the received signals are reordered in the second order. The second order is an order reversed from the first order, for example. The reordering is performed in the ranking unit 506 and the reordering unit 508-2 shown in FIG. 5.

In step 610, symbol candidates of the transmission signals are obtained based the QRM-MLD method using the received signals ordered in the second order.

In step 612, a symbol candidate and a metric are output as the maximum likelihood determination result based on the symbol candidate obtained in steps 606 and 610.

After that, the flow proceeds to step 614 and the process terminates. For the sake of convenience of explanation, although step 608 of reordering and step 610 of maximum likelihood determination by the second order are performed after step 606 of maximum likelihood determination by the first order, this is not essential for the present invention, and order of steps may be reversed, or the whole or a part of steps may be performed simultaneously.

Figure 7:
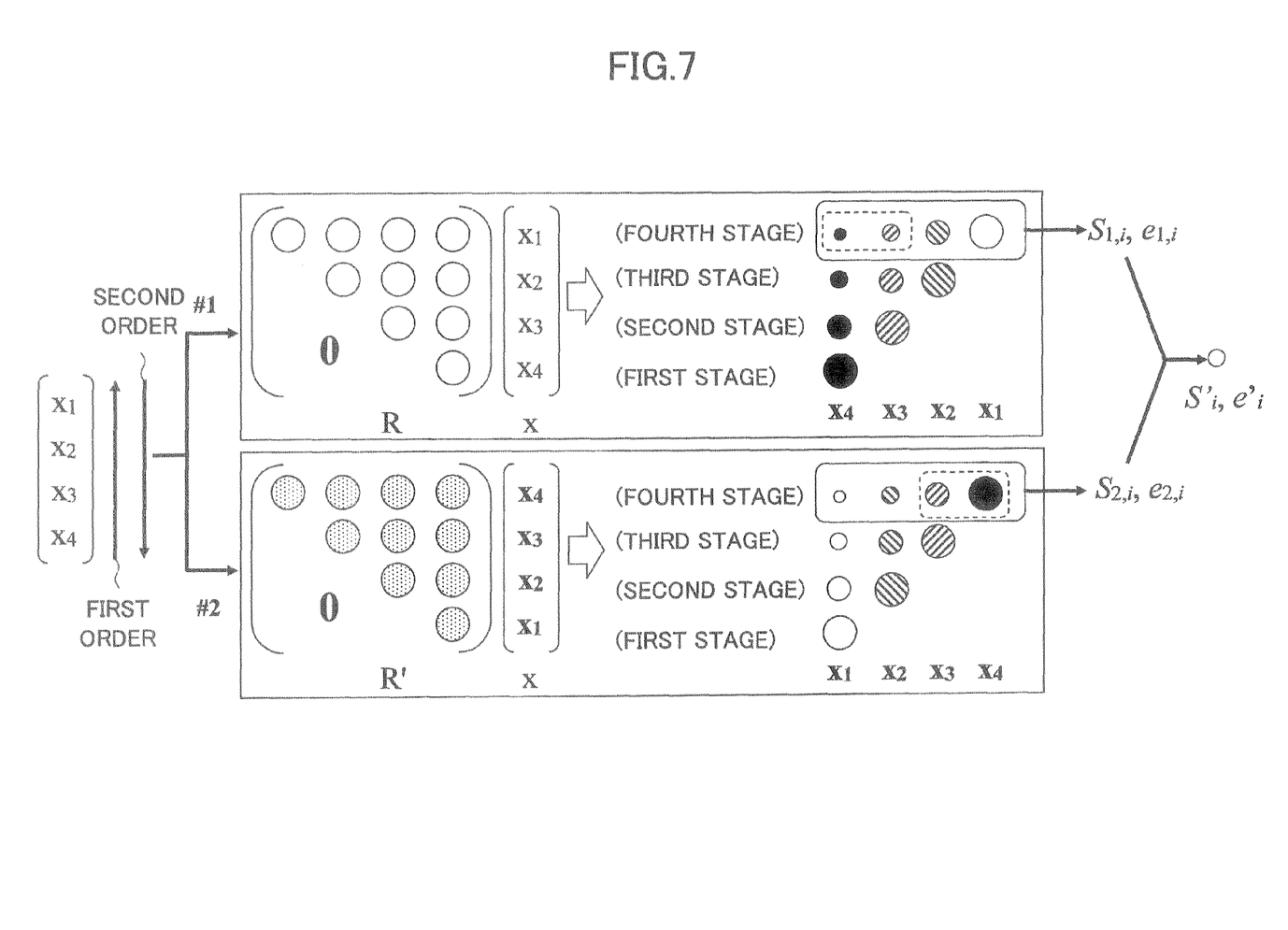
FIG. 7 is a schematic diagram showing a manner in which each maximum likelihood determination unit narrows down symbol candidates independently.

FIG. 7 is a figure for explaining the process for narrowing down symbol candidates sequentially. Maximum likelihood determination based on the first order is shown in the upper part of the figure, and maximum likelihood determination based on the second order is shown in the lower part. The size of each circle shown associated with transmission signals $x_1$~$x_4$ corresponds to the number of symbol candidates. As shown in the upper part, symbol candidates for transmission signals $x_4$, $x_3$ and $x_2$ decrease as the stage proceeds. Numbers of candidates of transmission signals included in the symbol candidate $S_{1,i}$ output in the fourth stage that is the final stage are decreased in the order of $x_1$, $x_2$, $x_3$ and $x_4$. Therefore, there is a risk that likelihood for transmission signals $x_4$ and $x_3$ determined in early stages such as first and second stages becomes excessively small likelihood for transmission signals $x_1$ and $x_2$ is relatively large).

However, in the present embodiments as shown in the lower part, maximum likelihood determination is also performed based on received signals arranged in the second order that is different from the first order. In the maximum likelihood determination based on the second order, symbol candidates for transmission signals $x_1$, $x_2$ and $x_3$ decreases as the stage proceeds. Numbers of candidates of transmission signals included in the symbol candidate $S_{2,j}$ output in the fourth stage that is the final stage are decreased in the order of $x_4$, $x_3$, $x_2$ and $x_1$.

Therefore, although there is a risk that likelihood for transmission signals $x_1$ and $x_2$ determined in early stages such as first and second stages becomes excessively small, likelihood for transmission signals $x_3$ and $x_4$ can be kept to be large. Therefore, even if the number of symbol candidates for the transmission signals $x_3$ and $x_4$ becomes excessively small in maximum likelihood determination based on the first orders improper narrowing down can be compensated for by considering the maximum likelihood determination result based on the second order.

In the present embodiment, although the first and second orders that are reversed with each other with respect to the order of the size of the received power are used for the sake of simplifying explanations, the order may be determined based on other criteria. For example, an order following ratios of desired wave signal power to total power (SIR and the like). In addition, the second order may not be arranged to be strictly reversal to the first order. For example, the second order may be set such that order of a part of signals in the first order is changed (by permuting positions of $x_1$ and $x_4$ for example). The reason is that a symbol candidate missed in a maximum likelihood determination unit may be kept in another maximum likelihood determination unit when the first and second orders are different. But, like the present embodiment, when the first and second orders are reversed, a symbol candidate missed in the maximum likelihood determination unit 514-1 for the transmission signal $x_4$ can be acquired in the maximum likelihood determination unit 514-2 with maximum probability. Further, although the first and second orders are used in the present embodiment, more than two orders may be set so as to perform maximum likelihood determination related to the orders and select final symbol candidates from the determination results. By increasing kinds of orders for arranging received signals, possibility for avoiding excessive narrowing down for symbol candidates can be kept to be high.

Second Embodiment

Although maximum likelihood determination on the first order is performed completely independently of maximum likelihood determination on the second order in the first embodiment, a part of determination results of one side may be incorporated in determination calculation in another side. For example, determination results on the first and second transmission signals $x_1$ and $x_2$ in maximum likelihood determination results on the first order shown in FIG. 5 may be used for maximum likelihood determination on the second order. Information is provided from the maximum likelihood determination unit 514-1 to the maximum likelihood determination unit 514-2 via a signal line 520.

Figure 8:
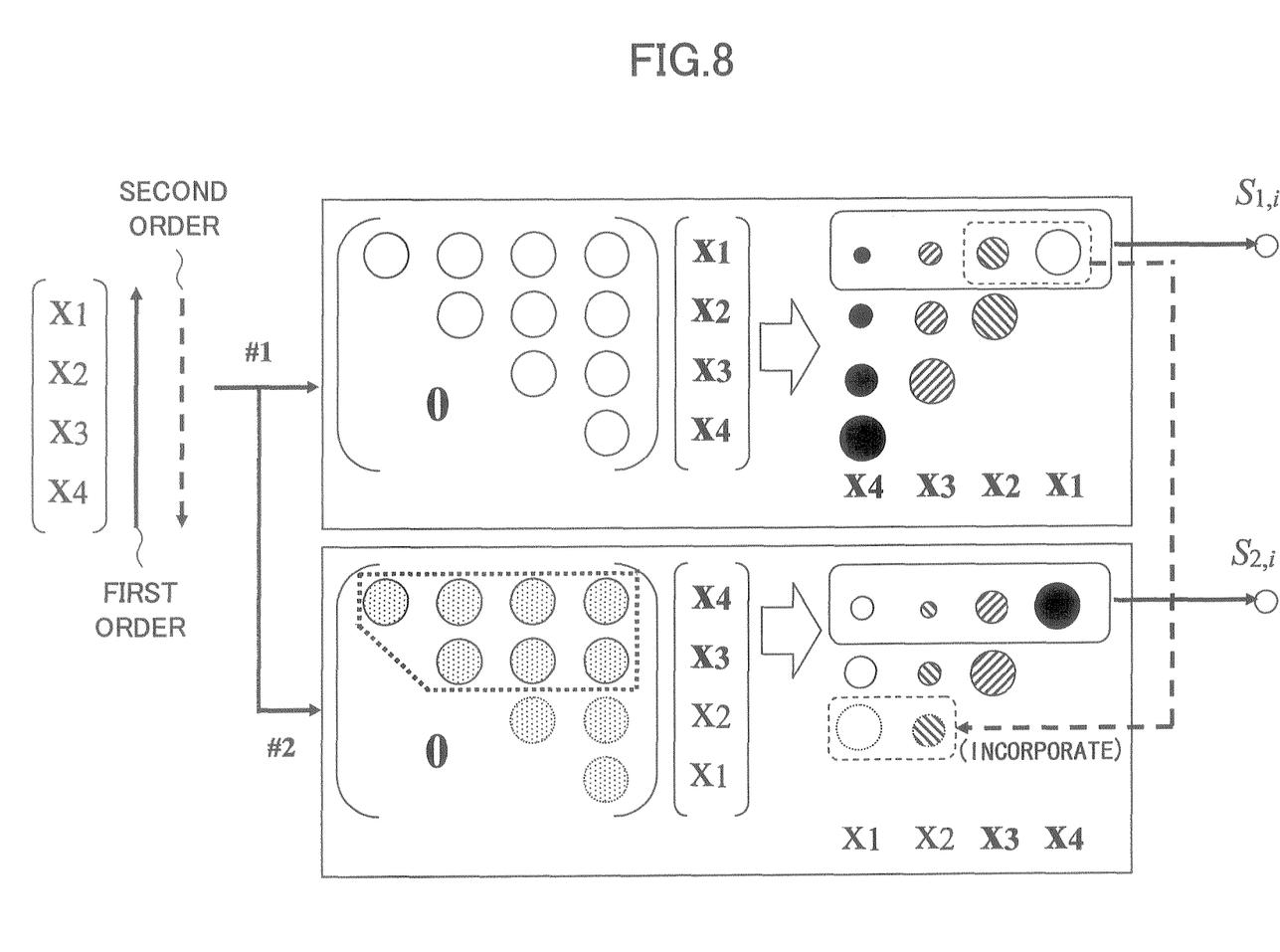
FIG. 8 is a schematic diagram showing a manner in which one of maximum likelihood determination units narrows down symbol candidates in conjunction with another one.

As shown in FIG. 8, symbol candidates (enclosed by a dotted line frames of the first and second transmission signals $x_1$ and $x_2$ included in determination results $S_{1,i}$ based on the first order are used for maximum likelihood determination based on the second order. In the example shown in the figures instead of performing all of the first to fourth stages, it is only necessary to perform the third and fourth stages. Since calculation for the first and second stages in maximum likelihood determination based on the second order can be omitted, calculation load can be decreased by that. Therefore, the present embodiment is especially advantageous when reliability of the maximum likelihood determination result in the maximum likelihood determination unit 514-1 (on the first and second transmission signals $x_1$ and $x_2$).

Although preferred embodiments of the present invention are described, the present invention is not limited to the embodiments, and variations and modifications may be made without departing from the scope of the invention.

The invention claimed is:

1. A signal detection apparatus for detecting transmission signals sent from transmission antennas based on received signals received by receiving antennas, comprising:

a first reordering unit configured to arrange the received signals in a first order;

a first QR decomposition unit configured to decompose a channel matrix between the received signals and the transmission signals into a unitary matrix Q and an upper triangular matrix R that correspond to the first order;

a first determination unit configured to determine symbol candidates of the transmission signals based on a QRM-MLD (Maximum Likelihood Detection with QR decomposition and M-algorithm) method using the received signals arranged in the first order, and using the unitary matrix Q and the upper triangular matrix R that correspond to the first order;

a second reordering unit configured to arrange the received signals in a second order that is different from the first order;

a second QR decomposition unit configured to decompose the channel matrix into a unitary matrix Q and an upper triangular matrix R that correspond to the second order;

a second determination unit configured to determine symbol candidates of the transmission signals based on the QRM-MLD method using the received signals arranged in the second order, and using the unitary matrix Q and the upper triangular matrix R that correspond to the second order; and an output unit configured to output symbol candidates and likelihood of the transmission signals based on determination results of at least the first and the second determination units.

2. The signal detection apparatus as claimed in claim 1, wherein the second order is the reverse of the first order.

3. The signal detection apparatus as claimed in claim 1, wherein the first or the second order is an order based on a signal quality of the received signals.

4. The signal detection apparatus as claimed in claim 1, wherein the second determination unit determines symbol candidates of a part of the transmission signals according to the detection result of the first determination unit.

5. The signal detection apparatus as claimed in claim 1, wherein the output unit updates likelihood of a symbol candidate commonly included in detection results of the first and the second determination units.

6. The signal detection apparatus as claimed in claim 5, wherein the updated likelihood is a weighted average of likelihoods of symbol candidates obtained by the first and the second determination units.

7. The signal detection apparatus as claimed in claim 5, wherein the updated likelihood is less than any of likelihoods of symbol candidates obtained by the first and the second determination units.

8. The signal detection apparatus as claimed in claim 5, wherein the updated likelihood is equal to one of likelihoods of symbol candidates obtained by the first and the second determination units.

9. A signal detection method, implemented on a signal detection apparatus, for detecting transmission signals sent from transmission antennas based on received signals received by receiving antennas, comprising:

arranging, at a first reordering unit of the signal detection apparatus, the received signals in a first order;

decomposing, at a first QR decomposition unit of the signal detection apparatus, a channel matrix between the received signals and the transmission signals into a unitary matrix Q and an upper triangular matrix R that correspond to the first order;

determining, at a first determination unit of the signal detection apparatus, symbol candidates of the transmission signals based on a QRM-MLD (Maximum Likelihood Detection with QR decomposition and M-algorithm) method using the received signals arranged in the first order, and using the unitary matrix Q and the upper triangular matrix R that correspond to the first order;

arranging, at a second reordering unit of the signal detection apparatus, the received signals in a second order that is different from the first order;

decomposing, at a second QR decomposition unit of the signal detection apparatus, the channel matrix into a unitary matrix Q and an upper triangular matrix R that correspond to the second order;

determining, at a second QR determination unit of the signal detection apparatus, symbol candidates of the transmission signals based on the QRM-MLD method using the received signals arranged in the second order, and using the unitary matrix Q and the upper triangular matrix R that correspond to the second order; and outputting, at an output unit of the signal detection apparatus, symbol candidates and likelihood of the transmission signals based on determination results obtained with respect to at least the first and the second orders.

* * * * *